Sept. 29, 1970   L. A. HEREDY   3,531,386
ELECTROCHEMICAL PROCESS FOR RECOVERING SULFUR VALUES
Original Filed May 15, 1967
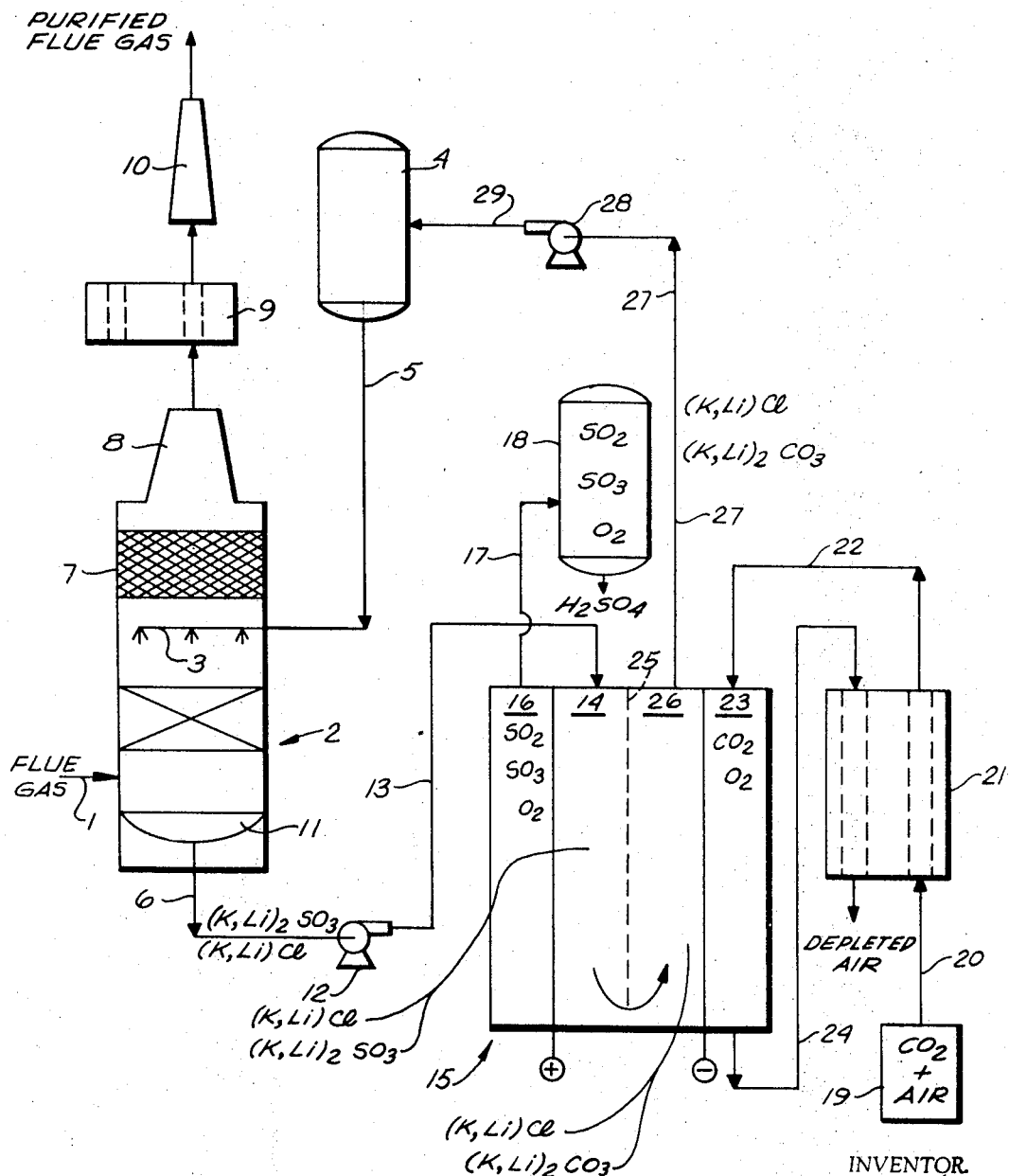
INVENTOR.
LASZLO A. HEREDY
Henry Kolin
ATTORNEY

United States Patent Office 3,531,386
Patented Sept. 29, 1970

---

3,531,386
**ELECTROCHEMICAL PROCESS FOR
RECOVERING SULFUR VALUES**
Laszlo A. Heredy, Canoga Park, Calif., assignor to North
American Rockwell Corporation, a corporation of
Delaware
Original application May 15, 1967, Ser. No. 638,364, now
Patent No. 3,479,261, dated Nov. 18, 1969. Divided and
this application Nov. 26, 1968, Ser. No. 779,119
The portion of the term of the patent subsequent
to Oct. 14, 1986, has been disclaimed
Int. Cl. B01k 1/00
U.S. Cl. 204—61                                                5 Claims

---

ABSTRACT OF THE DISCLOSURE

A method for recovering sulfur values from a molten salt mixture containing alkali metal sulfate or sulfite by electrochemically converting the alkali metal sulfate or sulfite to sulfur oxides and oxygen as a recoverable product with simultaneous formation of alkali metal carbonates in the molten salt.

---

The method for removing sulfur dioxide from flue gas by absorption of the sulfur dioxide in a molten salt mixture containing alkali metal carbonate to provide a suitable feedstock for the electrochemical regeneration process of the present invention is described in patent application Ser. No. 638,528 now U.S. Pat. 3,438,722 and assigned to the assignee of the present invention.

Other processes that may be utilized for treatment of the resultant absorbent solution provided by the process described in U.S. 3,438,722 are described in the following patent applications, all filed of even date herewith and assigned to the assignee of the present invention: "Two-Stage Process for Recovering Sulfur Values," Ser. No. 779,176; "Carbonaceous Process for Recovering Sulfur Values," Ser. No. 779,118; "Carbon Oxide Regenerant for Sulfur Production," Ser. No. 779,175; and "Carbonaceous Process for Sulfur Production," Ser. No. 779,173.

BACKGROUND OF THE INVENTION

This invention relates to a process for the removal of sulfur compounds from molten salts. It particularly relates to a process wherein sulfur values are recovered from a molten salt mixture containing alkali metal sulfate or sulfite by a single-stage process wherein the molten salt mixture is electrochemically treated so as to recover the sulfur values therefrom as sulfur oxides while at the same time alkali metal carbonate is formed in the molten salt.

Sulfur oxides, principally as sulfur dioxide, are present in the waste gases discharged from many metal refining and chemical plants and in the flue gases from electric power plants. The control of air pollution resulting from this discharge of sulfur oxide into the atmosphere has become increasingly urgent. An additional incentive for the removal of sulfur oxides from waste gases is the recovery of sulfur values otherwise lost by discharge to the atmosphere. However, particularly with respect to the flue gases from power plants, which based on the combustion of an average coal may contain as much as 3000 p.p.m. sulfur dioxide and 30 p.p.m. sulfur trioxide by volume, the large volumes of these flue gases relative to the quantity of sulfur which they contain make removal of the sulfur compounds from these gases expensive. Also, while the possible byproducts, such as elemental sulfur and sulfuric acid, that may be ultimately obtained from the recoverable sulfur values have virtually unlimited markets as basic raw materials, they sell for relatively low figures. Consequently, low-cost recovery processes are required. The absorption process described in U.S. 3,438,722, wherein sulfur dioxide present in flue gas is absorbed in a molten alkali metal carbonate mixture, provides one source for a molten salt composition treated by the present process.

Summary of the invention

It is an object of the present invention to provide a highly efficient method for recovering sulfur values from molten salt compositions using inexpensive readily available materials and avoiding the use of expensive equipment. The present single-stage process provides for electrochemically recovering sulfur values in a form readily convertible to sulfuric acid.

In accordance with this invention, the electrochemical recovery of sulfur values from the molten salt as sulfur oxides in the anode compartment and the simultaneous formation of alkali metal carbonate in the melt in the cathode compartment is accomplished by feeding the molten salt composition to the anode compartment while simultaneously using carbon dioxide and oxygen as cathodic feed material.

One source of the sulfate- or sulfite-containing molten salt mixture treated by the present process is provided by the absorption process shown in U.S. 3,438,722 wherein sulfur oxides present in a hot combustion gas generally produced by burning a sulfur-containing hydrocarbon or fossil fuel are removed from the combustion gas by contacting the gas at a temperature of at least 325° C. suitably between 325 and 650° C. with a molten salt mixture containing alkali metal carbonates as active absorbent to thereby remove the sulfur oxides. The melting temperature of the salt mixture is preferably between 325 and 450° C. The resultant sulfur compound that is formed consists principally of alkali metal sulfite, derived from the sulfur dioxide, and may also contain alkali metal sulfate, derived from the $SO_3$ initially present or formed by oxidation of a portion of the formed sulfite. Preferably, no more than a stoichiometric amount of alkali metal carbonate absorbent is supplied in the molten salt for reaction with $SO_2$ and $SO_3$, so that substantially all of this alkali metal carbonate is converted to alkali metal sulfite and sulfate.

In the electrochemical process of the present invention, the alkali metal sulfite and sulfate are converted to a mixture of $SO_3$, $SO_2$, and $O_2$ gases in the anode compartment of an electrolysis cell. Carbon dioxide and a source of oxygen, preferably air, are fed to the cathode compartment to form alkali metal carbonate for recirculation in the process. The gaseous mixture of $SO_2$, $SO_3$, and $O_2$ is recovered as a suitable feedstock for a sulfuric acid plant. The electrochemical process is performed at a temperature of at least 325° C. at which the alkali metal sulfite-containing salt is molten, suitably between 325 and 650° C. A temperature between 375 and 475° C. is preferred.

Consistent with kinetic requirements for the electrochemical process, lower temperatures are generally favored to minimize corrosion effects. While an overall process temperature between 325 and 650° C. at which the salt mixture is molten may be utilized, a temperature between 375 and 475° C. is preferred.

Brief description of the drawing

The sole figure of the drawing shows a schematic flow diagram illustrating a preferred embodiment of the electrochemical process of the invention in conjunction with a prior absorption step for the treatment of hot combustion gases obtained by the burning of a sulfur-containing fossil fuel in an electric generating plant.

Description of the preferred embodiments

The present invention is broadly directed to an improved method of electrochemically treating a molten salt mixture containing alkali metal sulfates and sulfites for recovering sulfur values therefrom as sulfur oxides. The process will be particularly described in conjunction with a prior absorption stage, not a part of this invention, which may be employed to provide one source for a molten salt mixture treated by the present process. The absorption stage per se is shown in U.S. 3,438,722, which is incorporated herein by reference. In the absorption stage, sulfur oxides present in a hot combustion gas generally produced by burning a sulfur-containing hydrocarbon or fossil fuel are removed from the combustion gas by contacting the gas at a temperature of at least 325° C. with a molten salt mixture containing alkali metal carbonates as active absorbent to thereby remove the sulfur oxides.

However, because of the subsequent electrochemical regeneration in which $SO_2$ and $SO_3$ are produced and because of the reactivity of $SO_2$ and $SO_3$ with alkali metal carbonate to form, respectively, alkali metal sulfite and sulfate, the presence of excess amounts of alkali metal carbonate in the molten salt is not desirable. Thus, in a preferred aspect of practicing the absorption stage, the combustion gas is treated with a molten salt mixture containing the minimal required amount of alkali metal carbonate to react completely with the $SO_2$ and $SO_3$ in the flue gas for conversion, respectively, to alkali metal sulfite and sulfate. Thus, the reactive alkali metal carbonates ordinarily constitute only a minor component of the absorbent melt, generally less than 30 mole percent.

The present invention directed to an electrochemical process for the recovery of sulfur values from certain molten salt compositions will be particularly illustrated with respect to the Pr:or removal of sulfur oxides from hot combustion gases obtained by the burning of sulfur-containing fossil fuels, particularly in electric generating plants. Referring to the drawing, a flue gas obtained from the combustion of a sulfur-containing coal is admitted at a temperature of about 425±25° C. by way of a conduit 1 to an absorber unit 2. For a typical 1000-Mw. (e) coal-fired electric utility plant utilizing coal containing 3 wt. percent sulfur, about 4,650,000 cubic ft./min. flue gas with an $SO_2$ content of about 0.18 vol. percent is generated. The flue gas is passed through a fly ash precipitator (not shown) to remove fine particles entrained therein, prior to entry into the absorber. For a 1000-Mw.(e) plant, absorber unit 2 ordinarily consists of five stainless steel cyclone spray towers in parallel arrangement. These towers are suitably insulated with about 5 inches of high temperature insulation so that the temperature drop within them is less than five degrees centigrade.

The flue gas enters tangentially at the base of absorber 2 and travels upwardly with a velocity of about 20 ft./sec. It is contacted countercurrently by a spray of molten salt containing alkali metal carbonate (B.P. of salt about 375° C.) which is discharged through a spray distributor 3 located about 15 ft. above the base of the absorber tower. The molten salt containing between 2 and 30 mole percent carbonate is contained in a storage vessel 4, which is suitably insulated and equipped with heaters so as to maintain the carbonate-containing salt in a molten state. The molten salt leaves vessel 4 by way of a conduit 5 connected to spray distributor 3 at a flow rate adjusted to provide substantially complete conversion of carbonate to sulfite, so that about 2–30 mole percent sulfite content in the effluent molten salt stream leaves the bottom of absorber 2 by way of a conduit 6.

After contacting the molten salt spray, the desulfurized flue gas flows past distributor 3 into a wire demister 7, which is about one foot thick and located in the upper section of the absorber tower about two feet above the distributor. The demister serves to remove entrained salt-containing droplets from the flue gas, which is then passed through a conical transition section 8 to minimize pressure drops in the absorber tower and then through a plurality of heat exchangers 9, from which it emerges at a temperature of about 150° C. Heat exchangers 9 may serve as preheaters for the water and the air used in the generating plant. The cooled flue gas from heat exchangers 9 is discharged to the atmosphere through a power plant stack 10.

The molten salt mixture in vessel 4 contains the alkali metal carbonates which serve as active absorbent. Because of the subsequent requirements of electrochemical regeneration, the melt utilized contains preferably a minimal amount of alkali metal carbonate, sufficient only to satisfy the stoichiometric requirements based on reaction with the $SO_2$ and $SO_3$ present in the flue gas. Any excess amount of alkali metal carbonate in the molten salt fed to the electrolysis cell will react with generated $SO_2$ and $SO_3$, resulting in a waste of electrical energy and corresponding loss in cell efficiency. Thus, in the practice of this invention the excess carbonate is not suitable as a molten solvent for the active molten absorbent. Preferably a chloride salt carrier is used. A preferred composition, for example, a lithium-potassium salt mixture containing chloride and carbonate, is molten at a temperature of 375° C. Either a single alkali metal carbonate or a binary or ternary mixture of the alkali metal carbonates may be utilized with the noncarbonate salt carrier, the final mixture containing two or more alkali metal cations. In such a system, as little as 2 mole percent of alkali metal carbonate may be present with the remaining 98 mole percent being an inert diluent carrier, although generally at least 5–10 mole percent of alkali metal carbonate is preferable. Illustrative of such a suitable and preferred mixture is one utilizing a LiCl-KCl eutectic (M.P. 348° C.) wherein the starting salt ratio consists of 64.8 mole percent LiCl and 35.2 mole percent KCl. An absorbent molten mixture containing 90 mole percent of the LiCl-KCl eutectic and 10 mole percent of potassium and lithium carbonates of a corresponding molar ratio has a melting point of about 375° C. Suitable chloride-carbonate molten salt mixture contain, in mole percent, 15–60 $K^+$, 40–85 $Li^+$, and 0–20 $Na^+$, as cations, and 70–98 $Cl^-$ and 2–30 $CO_3^=$ as anions. The amount of anionic carbonate present will be determined by the amount of $SO_2$ and $SO_3$ to be removed. For a typical flue gas containing no more than 3000 p.p.m. $SO_2$, the anionic mole percent will vary from about 80–98 $Cl^-$ and 2–20 $CO_3^=$. The present invention will therefore be illustrated with a molten salt absorbent utilizing 90 mole percent of the LiCl-KCl eutectic and 10 mole percent of potassium and lithium carbonates of a corresponding molar ratio, which has a melting point of about 375° C.

The sulfite-containing molten salt resulting from the rapid reaction between the molten alkali metal carbonate and the sulfur oxides in the flue gas is collected in a dished-bottom heated sump 11 of absorber 2. After absorption, the molten salt contains a minimal amount of excess unreacted carbonate and consists essentially of a molten solution of potassium-lithium sulfite in excess potassium-lithium chloride. The sulfite-chloride mixture is pumped from sump 11 of absorber 2 through conduit 6 by way of a pump 12, then through a conduit 13 to an anode compartment 14 of an electrolysis cell 15 of stainless steel or other corrosion-resistant material. The sulfite-chloride mixture is at a temperature of about 425±25° C. The melt flows downward, gradually losing first sulfite and then sulfate. The remaining melt, principally chloride, flows from the bottom of the anode compartment into the cathode compartment. $SO_2$, $SO_3$, and $O_2$ mixture evolves on the porous positive electrode and is collected in the anode gas chamber 16. The porous positive electrode separating compartments 14 and 16 is porous to the passage of gases but impermeable to the melt. The formed gaseous mixture leaves anodic gas compartment 16 by way of a conduit 17 and is fed to a sulfuric acid plant, shown as a storage vessel 18.

Although the reactions occurring in the anode compartment are relatively complex and are but imperfectly understood, and the following explanation is not to be construed as limiting the present invention, the anodic cell reactions may be formulated as follows:

$$SO_3^= \rightarrow SO_3 + 2e$$
$$SO_3 + SO_3^= \rightarrow SO_4^= + SO_2$$
$$SO_4^= \rightarrow SO_3 + \tfrac{1}{2}O_2 + 2e$$

The overall anode reaction may be written as:

$$2SO_3^= \rightarrow SO_2 + SO_3 + \tfrac{1}{2}O_2 + 4e$$

For the cathodic reaction, a mixture of carbon dioxide and air from a suitable source 19 is fed by way of a conduit 20 to a heat exchanger 21, where its temperature is increased, and then is fed by way of a conduit 22 to a cathodic gas compartment 23 of electrolysis cell 15. After reaction, depleted air is removed from compartment 23 by way of a conduit 24, the depleted air giving up heat by passage through heat exchanger 21.

In cell 15, a porous separator 25 prevents mixing of the melts in anode compartment 14 and in a cathode compartment 26, while at the same time being permeable to the passage of ions therethrough. For the cathodic reaction, the chloride melt from compartment 14 enters at the bottom of compartment 26 and reacts at the porous negative electrode to form alkali metal carbonate in excess carrier chloride. This molten salt is pumped from cathode compartment 26 through a conduit 27 by means of a pump 28 through a conduit 29 for return to storage vessel 4 and recirculation in the process.

The cathode reaction is a well-known one and may be formulated as follows:

$$CO_2 + \tfrac{1}{2}O_2 + 2e \rightarrow CO_3^=$$

Such a reaction is utilized extensively in high temperature fuel cell operations, as shown for example in the description of the reaction and typical electrode structures therefor by E. Gorin and H. L. Recht "High Temperature Fuel Cells," in Fuel Cells (W. Mitchell, Ed.), pp. 210–212, Academic Press, New York, 1963. For a representative electrolysis cell, the cathode is constructed of porous lithiated NiO ceramic. Silver may also be used for a cathode structure in the form of 80-mesh gauze. While effective in this form, a finer mesh gauze or a silver powder activator gives better performance. At current densities up to 0.1 amp/cm.$^2$, both silver and lithiated NiO cathode structures are free from electrode polarization.

Combining the anode and cathode cell reactions, the overall cell reaction may be formulated as follows:

$$2SO_3^= + 2CO_2 + O_2 \rightarrow 2CO_3^= + SO_2 + SO_3 + \tfrac{1}{2}O_2$$

For the regeneration stage, electrical energy is supplied to cell 15 in accordance with the indicated polarities. Without considering polarization effects, the required minimal cell voltages for regeneration are 0.1 volt for sulfite electrolysis and 1.1 volts for sulfate electrolysis. The electrolysis of sulfite and evolution of $SO_2$ gas from the melt therefore occurs before electrolysis of sulfate, which is either originally present or formed during the course of the reaction. Losses due to polarization and cell resistance will require use of higher voltages under actual cell operating conditions. However, the effective cell voltage must be kept below the higher cell voltage for chlorine formation so that electrolysis of chloride does not occur. Otherwise, contamination by chlorine of the feedstock gases to the sulfuric acid plant will result.

The following examples illustrate the practice of this invention but are not to be construed as unduly limiting its generally broad scope.

EXAMPLE 1

Absorption of $SO_2$ by melts containing fractional carbonate concentrations

A reciprocal salt system was prepared by mixing 40 grams of a LiCl-KCl eutectic (58 mole percent LiCl, 42 mole percent KCl, m.p. 348° C.) with 10 grams $Li_2CO_3$ and 5.34 grams KCl. The material was premelted in air and appeared to transform into a viscous melt at a temperature between 350 and 375° C. The analysis of the melt composition was as follows:

INITIAL MELT COMPOSITION

| Substance: | Grams | Wt. percent | Cationic or anionic, mole percent |
|---|---|---|---|
| Li$^+$ | 4.76 | 8.8 | 65.6 |
| K$^+$ | 14.02 | 25.8 | 34.3 |
| Cl$^-$ | 17.44 | 50.5 | 85.1 |
| CO$_3^=$ | 8.13 | 15.0 | 14.9 |

Pure $SO_2$ was used as the feed gas, the flow rate being varied from 9 to 14 ml./min. This feed gas was bubbled through about 1½–2 in. of the melt which was maintained in a quartz tube immersed in a KCl-LiCl eutectic constant temperature bath held at 400° C. The percent of absorption of the $SO_2$ by the melt as it bubbled through decreased from 100% to 98.4% after the flow rate had been increased to 14 ml./min. and 65% of the carbonate had been converted to sulfite. Thus, a KCl-LiCl melt containing less than 15 mole percent carbonate removed more than 99% of the $SO_2$ gas bubbled through it; more than 98% of the $SO_2$ gas was picked up in a melt containing only about 5 mole percent carbonate. The freezing point of the final lithium-potassium salt mixture containing approximately 85, 10, and 5 mole percent chloride, sulfite, and carbonate, respectively, was 325° C. compared with the 350–375° C. range of the starting composition. The test results are indicative that melts containing as little as 2 mole percent carbonate would remove more than 90% of the $SO_2$ content of gases bubbled through them.

EXAMPLE 2

Electrochemical regeneration

A quartz U-tube was used which contained a salt consisting of 0.063 mole $K_2SO_3$ dissolved in a LiCl-KCl eutectic. Sufficient LiCl was then added to give a final K:Li ratio of 1:3.32. The melting point of the salt solution was 335° C. The anode reaction was performed in this cell at a temperature of about 400° C., the reaction gases being absorbed by passage through two 1.1 molar NaOH absorption traps. Various electrode materials (Ni, C, and Pt) and current densities (0.05–0.5 amp/cm.$^2$) were used for several runs. All three electrode materials were found suitable. At high current densities, above 0.3 amp/cm.$^2$, some chloride ion was also discharged at the anode due to concentration polarization in the melt. However, at lower current densities, below 0.2 amp/cm.$^2$, the discharge of chloride was avoided. The run was carried out for 3 hours, which was sufficient for electrolytic discharge of most of the sulfite present. Analysis of the collected gases and of the melt showed that the principal anodic products formed from $(K,Li)_2SO_3$ were $SO_2$ and $(K,Li)_2SO_4$, as predicted for the run.

It will of course be realized that many variations in reaction conditions may be used in the practice of this invention.

While certain exemplary reactions have been described for the process of the present invention, it has been found that the actual mechanism of reaction is a highly complex one and several competing reactions may occur simultaneously. Therefore, to optimize the process, varying reaction temperatures and pressures may be employed. For the electrochemical reaction, different electrode structures, cell designs, and operating parameters may also be used. Further, a batch process or a continuous process, preferably the latter, may be used, with the usual provision for recycle of various unreacted or partially reacted components. Also, even when the desired reactions do not go to completion and products are additionally present produced by competing or undesired side reactions, the unreacted or undesired products may be recycled in the process without substantial interference therewith.

With respect to electrochemical regeneration, where the feedstock is obtained by a prior absorption step it is important that during the prior absorption step the carbonate in the absorbent be converted to sulfite as completely as possible. Any carbonate which remains in the molten salt mixture will react with the $SO_2$ or $SO_3$ generated during electrolysis, forming, respectively, sulfite and sulfate, and generating carbon dioxide gas. The net result of these side reactions is a decrease in the current efficiency of the electrolysis.

It should further be noted that when a melt containing sulfite, sulfate, and chloride of the alkali metals is electrolyzed, the anions are electrolytically discharged in the order of increasing decomposition potential, sulfite first discharging, followed by sulfate, and then by chloride. Thus, when the electrolysis is carried out at a suitable effective cell potential below the decomposition potential of alkali metal halides, only sulfite and sulfate will be discharged.

The present process has been illustrated with respect to a prior absorption step for the removal of $SO_2$ gas by its initial conversion to sulfite. However, the presence in the flue gas of $SO_3$, which is ordinarily but a minor fraction of the sulfur oxide content, does not interfere with the operation of the process. Thus, any $SO_3$ gas initially present is converted to alkali metal sulfate and fed to the electrolytic cell along with the sulfite-containing molten salt mixture. During the regeneration stage, the sulfate will also be converted. Thus, while the examples illustrating this invention have been described with respect to specific reactants, concentrations, times, temperatures, and other reaction conditions, the invention may be otherwise practiced, as will be readily apparent to those skilled in this art. Accordingly, this invention is not to be limited by the illustrative and specific embodiments thereof, but its scope should be determined in accordance with the claims thereof.

I claim:

1. The process for recovering sulfur values which comprises feeding a molten salt composition containing as reactive component alkali metal sulfates, alkali metal sulfites, or a mixture thereof, at a first preselected rate to the anode compartment of an electrolysis cell, feeding a gaseous mixture containing carbon dioxide and oxygen at a second preselected rate to a cathode compartment of said electrolysis cell, and supplying electrical energy to said electrolysis cell to electrochemically convert alkali metal sulfates, alkali metal sulfites, or a mixture thereof in the melt to form alkali metal carbonates in said melt in the cathode compartment and a gaseous mixture of $SO_2$, $SO_3$, and $O_2$ in the anode compartment as a recoverable product.

2. The process for recovering sulfur values which comprises feeding a molten salt containing alkali metal sulfites as reactive component at a first preselected rate to the anode compartment of an electrolysis cell, feeding a gaseous mixture containing carbon dioxide and oxygen at a second preselected rate to a cathode compartment of said electrolysis cell, and supplying electrical energy to said electrolysis cell to electrochemically convert alkali metal sulfites in the melt to form alkali metal carbonates in said melt in the cathode compartment and a gaseous mixture of $SO_2$, $SO_3$, and $O_2$ in the anode compartment as a recoverable product.

3. The process according to claim 2 wherein the temperature for the electrochemical reaction is maintained between 325 and 650° C.

4. The process according to claim 2 wherein the source of oxygen fed to the cathode compartment is air.

5. The process according to claim 2 wherein the molten salt fed to the anode compartment consists essentially of a molten solution of potassium-lithium sulfite in potassium-lithium chloride.

References Cited

UNITED STATES PATENTS

| 642,390 | 1/1900 | Van Denbergh | 204—61 |
| 679,997 | 1/1901 | Scholl | 204—61 X |
| 2,207,308 | 7/1940 | Weaver | 23—61 X |
| 3,129,063 | 4/1964 | Zirngibl | 23—177 X |

PATRICK P. GARVIN, Primary Examiner

C. F. DEES, Assistant Examiner